W. KIESER.
APPARATUS FOR REMOVING AIR FROM WATER.
APPLICATION FILED JAN. 14, 1910.
1,095,463.
Patented May 5, 1914.
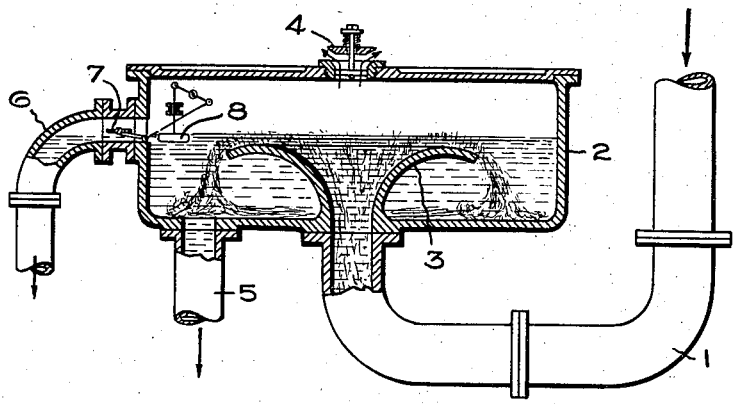
Witnesses:
Inventor,
Walter Kieser

UNITED STATES PATENT OFFICE.

WALTER KIESER, OF BERLIN, GERMANY, ASSIGNOR TO GENERAL ELECTRIC COMPANY, A CORPORATION OF NEW YORK.

APPARATUS FOR REMOVING AIR FROM WATER.

1,095,463.  Specification of Letters Patent.  Patented May 5, 1914.

Application filed January 14, 1910. Serial No. 538,035.

*To all whom it may concern:*

Be it known that I, WALTER KIESER, a citizen of Switzerland, residing at Berlin, Germany, have invented certain new and useful Improvements in Apparatus for Removing Air from Water, of which the following is a specification.

This invention relates to means for freeing water of air which has been absorbed thereby, and is of especial value in the case of steam condensing systems, or centrifugal air pumps of the "throwing" type. To this end, the mass of water must be given a rapid flow and caused to change its direction rather suddenly, at the same time being spread over a large surface, so that the particles of air, by reason of their *vis viva*, assisted by their low specific weight, will fail to follow the change of direction of the water, but will escape into the atmosphere.

The accompanying drawing is a sectional view of a device embodying my invention.

The pipe 1 conveying the mass of water to be de-aerated preferably enters the bottom of a closed shallow vessel 2, wherein is provided a flaring nozzle or plate 3 which delivers the water in an umbrella-shaped stream. In other words, the water enters in an upward direction at a central point, and is then diverted radially and horizontally therefrom, that is, concentrically outward toward the entire periphery of the circular nozzle, from whose rim it falls downwardly. The particles of air contained in the water tend to continue their upward course, because of their *vis viva* imparted by the rapid flow of the water, and because of their considerably lower specific gravity. This separation is enhanced by reason of the fact that the individual molecules of water no longer compress the air, owing to the large outflow surface afforded by the nozzle. The liberated air particles rise into the upper part of the vessel and pass out into the atmosphere when the pressure of the air becomes sufficient to lift the spring or weighted vent valve 4 controlling an escape outlet in the top of the closed vessel. The de-aerated water flows out of the vessel partly through the escape pipe 5, connected either with the condenser or with the pump water tank, as the case may be; and partly through the overflow 6, when the water backs up to the level thereof. The quantity of water passing off by this overflow corresponds to the water of condensation or other additions to the original body of water in the system. A cut-off or valve 7 may be arranged in the overflow outlet, which will close it when the condenser operation is interrupted. This valve may act automatically, if desired, being connected with a float 8 which will shut the valve when the water falls below a predetermined level. This valve and the vent valve 4 are designed to prevent the condenser from filling with air at atmospheric pressure when it ceases to operate.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A device for de-aerating water comprising a supply pipe having an unobstructed outlet and an imperforate plate into which said outlet emerges, which plate curves upwardly and outwardly from said outlet at such an angle that it acts on the water as it emerges from the outlet to effect a sudden change in its direction of flow and at the same time presents a surface over which the water spreads in a relatively thin sheet.

2. A device for de-aerating water comprising an upwardly extending pipe and an imperforate upwardly and outwardly flaring nozzle on the end of the pipe, the outer portion of said nozzle diverging at an angle of substantially 90° to the base thereof, whereby the water is conducted concentrically outward from said pipe, has its direction quickly changed, and is discharged over the outer portion of the nozzle in a thin layer and substantially at right angles to the direction that it had in entering the nozzle.

3. A device for de-aerating water comprising an upwardly extending pipe, a flaring nozzle on the end of said pipe that curves upwardly and outwardly from its inlet and conducts the water received from the pipe outwardly over its rim, a vessel for collecting the water and the air separated therefrom, and separate escape outlets for said water and air.

4. A device for de-aerating water comprising an upwardly extending pipe, a flaring nozzle thereon for conducting the water concentrically outward therefrom, a vessel for collecting the water and the air removed therefrom, separate escape outlets for the water and the air, and valves for closing said outlets.

5. A device of the class described comprising a supply pipe, and a circular nozzle into which the upper end of the pipe merges, the surface of the nozzle curving upward and outward from the pipe through 90 degrees and then extending outward in an approximately horizontal direction to first change the direction of flow and then spread the flowing fluid over its surface in a relatively thin sheet.

6. A device of the class described comprising a chamber into which a mixture of gas and liquid is delivered and its components separated, an outlet for the gas at the upper part of the chamber, a pressure responsive valve controlling the flow through the gas outlet, an outlet for liquid that leads from the chamber at a point below the gas outlet, and a float actuated valve controlling the flow through said liquid outlet.

7. A device of the class described comprising a chamber, a flaring nozzle arranged in the lower portion of the chamber that receives a mixture of gas and liquid and directs it outward toward the wall of the chamber to separate the gas from the liquid, an outlet for gas at the upper part of the chamber, a pressure responsive valve controlling the flow through the gas outlet, an outlet for liquid at the bottom of the chamber, a second outlet for liquid that leads from the chamber at about the level of the top of the nozzle, and a float actuated valve controlling the flow through the second outlet.

In witness whereof, I have hereunto set my hand this 18th day of December, 1909.

WALTER KIESER.

Witnesses:
OSKAR DAHLKE,
FRANZ SCHOERNER.